(12) United States Patent
Zhao et al.

(10) Patent No.: US 11,813,914 B2
(45) Date of Patent: Nov. 14, 2023

(54) HYDRAULIC ACTIVE SUSPENSION FLOW CONTROL SYSTEM

(71) Applicant: Yanshan University, Qinhuangdao (CN)

(72) Inventors: Dingxuan Zhao, Qinhuangdao (CN); Jianxu Zhu, Qinhuangdao (CN); Mingde Gong, Qinhuangdao (CN); Shuang Liu, Qinhuangdao (CN); Zhuxin Zhang, Qinhuangdao (CN); Zhiguo Sun, Qinhuangdao (CN); Tao Ni, Qinhuangdao (CN); Bin Yang, Qinhuangdao (CN); Hao Chen, Qinhuangdao (CN); Mingyuan Han, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 0 days.

(21) Appl. No.: 18/313,317

(22) Filed: May 6, 2023

(65) Prior Publication Data

US 2023/0278385 A1 Sep. 7, 2023

Related U.S. Application Data

(63) Continuation of application No. PCT/CN2022/084822, filed on Apr. 1, 2022.

(30) Foreign Application Priority Data

Apr. 2, 2021 (CN) .......................... 202110361524.3

(51) Int. Cl.
*B60G 17/018* (2006.01)
*F15B 13/02* (2006.01)

(52) U.S. Cl.
CPC .......... *B60G 17/018* (2013.01); *F15B 13/024* (2013.01); *B60G 2202/413* (2013.01); *F15B 2211/405* (2013.01)

(58) Field of Classification Search
CPC ............ B60G 17/018; B60G 2202/413; F15B 13/024; F15B 2211/405
(Continued)

(56) References Cited

U.S. PATENT DOCUMENTS 4,911,470 A    3/1990  Fukunaga
5,085,459 A *  2/1992  Sato ..................... B60G 17/018
                                                280/5.515
(Continued)

FOREIGN PATENT DOCUMENTS

CN    201281052 Y    7/2009
CN    101691878 A    4/2010
(Continued)

*Primary Examiner* — Toan C To
(74) *Attorney, Agent, or Firm* — True Shepherd LLC; Andrew C. Cheng

(57) ABSTRACT

A hydraulic active suspension flow control system includes a hydraulic oil tank, a variable displacement pump with an oil suction port communicating with the hydraulic oil tank, a check valve, a servo valve, a suspension cylinder controlled by the servo valve, an engine revolution speed sensor configured to detect an engine revolution speed, a vehicle speed sensor configured to detect a vehicle speed, an oil pressure sensor configured to detect an accumulator outlet pressure, a flow controller configured to control displacement of the variable displacement pump by receiving data from the engine revolution speed sensor, the vehicle speed sensor and the oil pressure sensor, and a relief valve connected to the check valve in parallel and provided at an oil outlet of the variable displacement pump. The variable displacement pump is connected to an engine through a
(Continued)

clutch; and an accumulator is connected between the servo valve and the check valve.

4 Claims, 7 Drawing Sheets

(58) Field of Classification Search
USPC ...... 280/124.157, 124.158, 124.159, 124.16, 280/124.161
See application file for complete search history.

(56) References Cited

U.S. PATENT DOCUMENTS

| | | | | |
|---|---|---|---|---|
| 5,251,929 | A * | 10/1993 | Kawabata | B60G 17/018 |
| | | | | 701/37 |
| 5,342,023 | A | 8/1994 | Kuriki et al. | |
| 5,601,307 | A * | 2/1997 | Heyring | B60G 21/06 |
| | | | | 701/37 |
| 6,467,748 | B1 | 10/2002 | Schick et al. | |
| 11,697,319 | B2 * | 7/2023 | Vandersmissen | B60G 13/08 |
| | | | | 280/5.514 |
| 2010/0230876 | A1 * | 9/2010 | Inoue | B60G 13/14 |
| | | | | 267/140.14 |
| 2011/0187065 | A1 * | 8/2011 | Van Der Knaap | B60G 17/08 |
| | | | | 280/5.507 |
| 2013/0074487 | A1 * | 3/2013 | Herold | F04B 17/00 |
| | | | | 60/455 |

FOREIGN PATENT DOCUMENTS

| | | |
|---|---|---|
| CN | 102278334 A | 12/2011 |
| CN | 103057374 A | 4/2013 |
| CN | 103397678 A | 11/2013 |
| CN | 105275044 A | 1/2016 |
| CN | 205423353 U | 8/2016 |
| CN | 106870481 A | 6/2017 |
| CN | 110497760 A | 11/2019 |
| CN | 110645231 A | 1/2020 |
| CN | 111573545 A | 8/2020 |
| CN | 111775648 A | 10/2020 |
| CN | 112193237 A | 1/2021 |
| CN | 113236617 A | 8/2021 |
| JP | 2003291621 A | 10/2003 |
| WO | 2013125638 A1 | 8/2013 |

* cited by examiner

HYDRAULIC ACTIVE SUSPENSION FLOW CONTROL SYSTEM

CROSS-REFERENCE TO RELATED APPLICATIONS

This application is a continuation of International Patent Application No. PCT/CN2022/084822 with a filing date of Apr. 1, 2022, designating the United States, now pending, and further claims priority to Chinese Patent Application No. 202110361524.3 with a filing date of Apr. 2, 2021. The content of the aforementioned applications, including any intervening amendments thereto, are incorporated herein by reference.

FIELD OF TECHNOLOGY

The present disclosure belongs to the technical field of automotive control, in particular to a hydraulic active suspension flow control system.

BACKGROUND OF THE PRESENT INVENTION

A suspension system is an important part of a vehicle chassis, and performance thereof determines the handling stability and ride comfort of a vehicle. Active suspension has excellent active adjustment functions, which may minimize the impact of the road on a vehicle body. Hydraulic active suspension is favored by manufacturers because of the strong bearing capacity and flexible adjustment methods thereof. The output component of a hydraulic suspension system is a hydraulic cylinder, and the system may automatically adjust the expansion of the suspension hydraulic cylinder based on road conditions. Each tire is correspondingly provided with a suspension cylinder to regulate the grounding characteristics of the tire and the body position, which may improve the ride comfort and handling stability of the vehicle.

An active suspension system requires energy input for operation. Currently, there are two types of power sources: an electric motor or an engine. For example, in the patent document with the publication number "CN108025614A", an electric motor is used as a power source. This application requires two energy conversions, resulting in energy waste. The engine directly drives a variable displacement pump, which may reduce the energy loss in the process of energy conversion and improve the utilization rate of energy, and is conducive to energy saving and environmental protection. However, the engine speed and the amount of hydraulic oil consumed by the movement of the suspension cylinder in the traveling process change with the vehicle speed, road conditions and other factors, and operating parameters of the engine and the suspension system may not be precisely matched.

In order to ensure the normal operation of the suspension system, the displacement of the variable displacement pump is generally adjusted to a range higher than that required by the system. Operating under such conditions, the whole system is kept in a high pressure state when oil provided by the variable displacement pump exceeds the regulating capacity of an accumulator, and when the system pressure exceeds the relief pressure of a relief valve, a large amount of high pressure oil flows back to a tank via the relief valve. When the vehicle operates in this condition for a long time, the engine power reserve is insufficient, and when the power consumed by the suspension system fluctuates greatly, the engine may jitter or even stall. Too much engine power is consumed by the suspension system, which reduces the traveling power of the vehicle and seriously affects the traveling performance of the vehicle.

SUMMARY OF PRESENT INVENTION

The present disclosure provides a hydraulic active suspension flow control system, such that the active suspension system of a vehicle operates stably and continuously, the engine power consumed by the active suspension system is reduced, the engine power is reasonably utilized, and engine jitter and stalling are effectively prevented.

In order to solve the above-mentioned technical problems, the present disclosure adopts the following technical solutions:

A hydraulic active suspension flow control system, comprising: a hydraulic oil tank, a variable displacement pump with an oil suction port communicating with the hydraulic oil tank, a check valve, a servo valve, a suspension cylinder controlled by the servo valve, an engine revolution speed sensor configured to detect an engine revolution speed, a vehicle speed sensor configured to detect a vehicle speed, an oil pressure sensor configured to detect an accumulator outlet pressure, a flow controller configured to control displacement of the variable displacement pump by receiving data from the engine revolution speed sensor, the vehicle speed sensor and the oil pressure sensor, and a relief valve connected to the check valve in parallel and provided at an oil outlet of the variable displacement pump; wherein the check valve, servo valve, and suspension cylinder are connected to the oil outlet of the variable displacement pump in sequence; the variable displacement pump is connected to an engine through a clutch, and an accumulator is connected between the servo valve and the check valve.

According to a further improvement of the technical solutions of the present disclosure, an outlet of the check valve is connected to the accumulator and a port P of the servo valve; a port A and a port B of the servo valve are connected to a rodless cavity and a rod cavity of the suspension cylinder respectively; a port T of the servo valve and an oil outlet of the relief valve are connected to the hydraulic oil tank; the oil pressure sensor is disposed at an outlet of the accumulator; and an output end of the flow controller is connected to a control end of the variable displacement pump to control the displacement of the variable displacement pump.

According to a further improvement of the technical solutions of the present disclosure, the flow controller achieves closed-loop control over the active suspension hydraulic system based on the accumulator outlet pressure, the vehicle speed and the engine revolution speed by the following method:

firstly, calculating, based on changes of the accumulator outlet pressure, a first displacement adjustment quantity of the variable displacement pump:

$$\Delta v_1 = k_1(p_0 - p_1),$$

where $p_0$ denotes a preset pressure threshold, $p_1$ denotes the accumulator outlet pressure, and $k_1$ denotes a proportionality coefficient;

secondly, calculating, based on the vehicle speed and engine revolution speed detected in real time, a second displacement adjustment quantity of the variable displacement pump by the following method:

(1) calculating an average flow provided by the variable displacement pump and an average vehicle speed within $t_0$ seconds before a current moment:

$$q_{average} = \frac{1}{t_0} \sum_{t-t_0}^{t} v_t n_t t_c, \text{ and}$$

$$u_{average} = \frac{1}{t_0} \sum_{t-t_0}^{t} u_t t_c,$$

where $q_{average}$ denotes the average flow provided by the variable displacement pump within $t_0$ seconds, $u_{average}$ denotes the average vehicle speed of a vehicle within $t_0$ seconds, $v_t$, $n_t$ and $u_t$ denote instantaneous displacement of the variable displacement pump, an instantaneous engine revolution speed and an instantaneous vehicle speed at a moment t respectively, and $t_c$ denotes sampling time; and (2) calculating, based on the average flow provided by the variable displacement pump, a current vehicle speed and the engine revolution speed, the second displacement adjustment quantity of the variable displacement pump:

$$\Delta v_2 = \begin{cases} \frac{k_2 q_{average} u}{u_{average}} \left( \frac{1}{n_t} - \frac{1}{n_{t-1}} \right) & u \neq 0 \\ k_2 q_{average} \left( \frac{1}{n_t} - \frac{1}{n_{t-1}} \right) & u = 0 \end{cases},$$

where $n_t$ and $n_{t-1}$ denote engine revolution speeds at the current moment and a previous moment respectively, $k_2$ denotes a proportionality coefficient, and u denotes the current vehicle speed; and finally, obtaining a total displacement adjustment quantity by adding the first adjustment quantity and the second adjustment quantity, that is, $\Delta v = \Delta v_1 + \Delta v_2$, obtaining a relationship between the total displacement adjustment quantity $\Delta v$ and a control current $\Delta i$ based on characteristic of the variable displacement pump, that is, $\Delta i = k \cdot \Delta v$, calculating and outputting the control current, and adjusting the displacement of the variable displacement pump, where k is a conversion coefficient between $\Delta i$ and $\Delta v$, with a specific value determined by the characteristics of the variable displacement pump.

According to a further improvement of the technical solution of the present disclosure, N variable displacement pumps are connected in series; the total displacement adjustment quantity $\Delta v$ is the sum of displacement adjustment quantities of all variable displacement pumps; and the final displacement adjustment quantity is allocated based on rated displacement of each variable displacement pump to obtain a displacement adjustment quantity of a single variable displacement pump, that is, an adjustment quantity of an ith variable displacement pump is:

$$\Delta v_i = \Delta v \cdot v_i \bigg/ \sum_{1}^{N} v_i,$$

where $v_i$ denotes the rated displacement of the ith variable displacement pump, and i=1, 2, . . . , N.

According to a further improvement of the technical solution of the present disclosure, one or more groups of servo valves and suspension cylinders controlled by the servo valves are provided.

By means of the above technical solutions, the present disclosure has the following technical progresses:

1. By means of the system, adaptive adjustment of the displacement of the variable displacement pump can be achieved, such that the operating status of the variable displacement pump changes with conditions of roads over which a vehicle travels, and there is no need to manually adjust system parameters when the vehicle travels on different roads.
2. By means of the system, the fluctuation of the outlet flow of the variable displacement pump and the pressure caused by rapid changes of the engine revolution speed and the flow consumed by the suspension system is reduced while the continuous operation of the active suspension system is ensured, the response is sensitive, and the system operates more stably.
3. By means of the system, matching between the suspension system and the engine of the vehicle is achieved, the active suspension system can utilize the engine power more reasonably, and stalling caused when the engine load is too high is effectively prevented.
4. In this system, the displacement adjustment quantity of the variable displacement pump is calculated by calculating the average flow consumed by the suspension system within a period of time before the current moment, which not only includes the flow consumed by suspension movement but also includes the leakage flow of the hydraulic system, such that the calculation is more accurate, and the accuracy of the final displacement adjustment quantity of the variable displacement pump is ensured.

1. Hydraulic oil tank, 2. Variable displacement pump, 3. Relief valve, 4. Check valve, 5. Oil pressure sensor, 6. Accumulator, 7. Suspension cylinder, 8. Servo valve, 9. Engine, 10. Engine revolution speed sensor, 11. Vehicle speed sensor, 12. Clutch, and 13. Flow controller.

DESCRIPTION OF THE EMBODIMENTS

The technical solutions according to the embodiments of the present disclosure will be clearly and completely described below with reference to the accompanying drawings according to the embodiments of the present disclosure. The described embodiments are only a part of the embodiments of the present disclosure, rather than all the embodiments. Based on the embodiments of the present disclosure, all other embodiments obtained by a person of ordinary skill in the art without inventive effort fall within the scope of the present disclosure.

Figure 1:
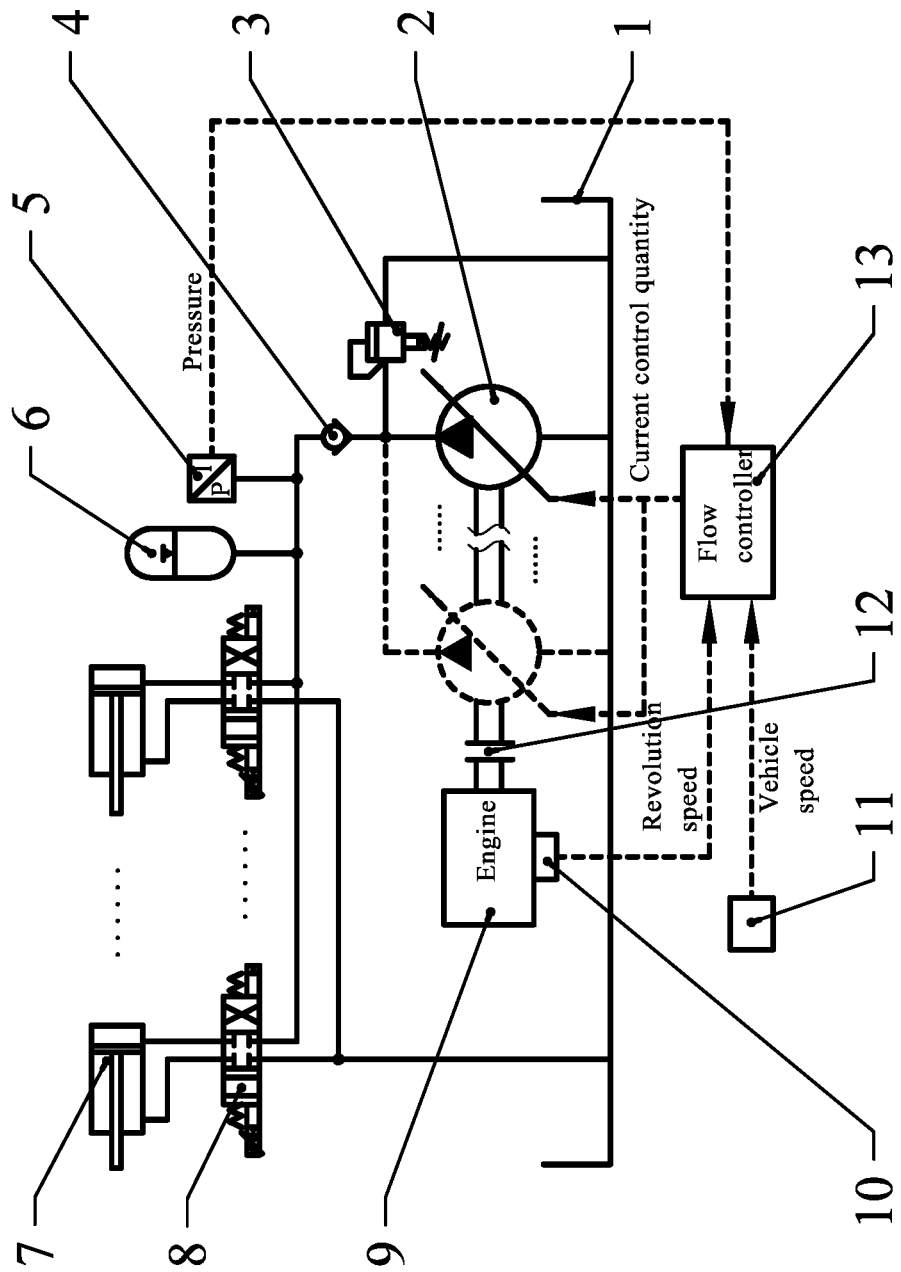
FIG. 1 illustrates a schematic diagram of a hydraulic active suspension flow control system according to the present disclosure.

On the basis of the problems in the prior art, the present disclosure provides a hydraulic active suspension flow control system. As shown in FIG. 1, the system mainly includes an oil tank 1, a variable displacement pump 2, a servo valve 8, and a suspension cylinder 7.

The suspension cylinder 7 is an executive element of the system. The action of the suspension cylinder 7 is controlled by the servo valve 8. The servo valve is generally a three-position four-way solenoid valve. In FIG. 1, when a right side of an electromagnet of the servo valve 8 is powered, the suspension cylinder 7 controlled by the servo valve extends; when a left side of the electromagnet is powered, the suspension cylinder 7 retracts; and when neither side is powered, the suspension cylinder 7 is in a rigid locked state. According to this embodiment, FIG. 1 merely illustrates two groups of servo valves and suspension cylinders controlled by the servo valves, and one or more groups of servo valves and suspension cylinders controlled by the servo valves may be provided based on actual conditions. When a plurality of groups of servo valves and suspension cylinders controlled by the servo valves are provided, each group of servo valve and suspension cylinder controlled by the servo valve are connected in parallel.

High pressure power oil of this system is provided by the variable displacement pump 2. A check valve 4 is disposed at an outlet of the variable displacement pump to prevent backflow of oil. An outlet of the check valve 4 is connected to the accumulator 6 and a port P of the servo valve 8 through a pipeline. An oil pressure sensor 5 is disposed at an outlet of the accumulator 6. As shown in FIG. 1, the check valve 4, the servo valve 8 and the suspension cylinder 7 are connected to the oil outlet of the variable displacement pump 2 in series in sequence, the accumulator 6 is located between the servo valve 8 and the check valve 4, and the oil pressure sensor 5 is located between the accumulator 6 and the check valve 4. A relief valve is disposed at the outlet of the variable displacement pump 2, and is opened for overflow when a system pressure exceeds a set value, in order to ensure the system safety.

A main shaft of the variable displacement pump 2 according to the present disclosure is connected to an engine 9 through a clutch 12, and the variable displacement pump 2 is driven by the engine 9 to operate. The variable displacement pump 2 may be an electric proportional variable displacement hydraulic pump to facilitate displacement adjustment.

Detection components of the system include an engine revolution speed sensor 10 configured to detect an engine revolution speed, a vehicle speed sensor 11 configured to detect a vehicle speed, and the oil pressure sensor 5 configured to detect an accumulator outlet pressure. The engine revolution speed sensor 10, the vehicle speed sensor 11 and the oil pressure sensor 5 are connected to a flow controller 13, and transmit data of the collected engine revolution speed, vehicle speed and accumulator outlet pressure to the flow controller 13 respectively. An output end of the flow controller 13 is connected to a control end of the variable displacement pump 2. The flow controller 13 performs calculation based on the engine revolution speed, the vehicle speed and the accumulator outlet pressure, and outputs a current value to change the displacement of the variable displacement pump 2.

The operating process of the present disclosure is as follows:

The high pressure oil in the system is consumed during the movement of the suspension cylinder 7. When a flow provided by the variable displacement pump 2 is not equal to a consumed flow, a flow difference is supplemented by the accumulator 6. In this case, the outlet pressure of the accumulator 6 is detected by the oil pressure sensor 5 and transmitted to the flow controller 13. The flow controller 13 calculates a first displacement adjustment quantity $\Delta v_1 = k_1 \Delta p$ of the variable displacement pump based on the difference between the detected outlet pressure $p_1$ of the accumulator 6 and a preset pressure threshold $p_0$, that is, $\Delta p = p_0 - p_1$. $\Delta v_1$ is used for adjusting the displacement of the hydraulic pump to ensure that the system pressure is not lower than the pressure threshold. The pressure threshold is the minimum pressure required for normal operation of the system.

At the same time, in order to reduce the sudden change of the outlet flow of the variable displacement pump and the pressure caused by the change of the engine revolution speed or the flow consumed by the suspension system, the flow controller changes the displacement of the variable displacement pump in real time by collecting the parameters such as the engine revolution speed and the vehicle speed. A specific method is as follows:

The engine revolution speed $n_t$ and the vehicle speed $u_t$ are detected by the engine revolution speed sensor 10 and the vehicle speed sensor 11 respectively and transmitted to the flow controller 13, and the flow controller 13 calculates an average flow and an average vehicle speed within the time $t_0$ respectively based on stored data:

$$q_{average} = \frac{1}{t_0} \sum_{t-t_0}^{t} v_t n_t t_c, \text{ and}$$

$$u_{average} = \frac{1}{t_0} \sum_{t-t_0}^{t} u_t t_c.$$

A second displacement adjustment quantity of the pump is then further calculated as:

$$\Delta v_2 = \begin{cases} \dfrac{k_2 q_{average} u}{u_{average}} \left( \dfrac{1}{n_t} - \dfrac{1}{n_{t-1}} \right) & u \neq 0 \\ k_2 q_{average} \left( \dfrac{1}{n_t} - \dfrac{1}{n_{t-1}} \right) & u = 0 \end{cases}$$

where $q_{average}$ denotes an average flow consumed by the suspension system within $t_0$ seconds, which includes a system leakage flow and a flow consumed during movement of the suspension cylinder, $k_2$ denotes a proportionality coefficient, $u_{average}$ denotes the average vehicle speed within $t_0$ seconds, and $v_t$ denotes instantaneous displacement of the variable displacement pump at a moment t.

$$\frac{u}{u_{average}}$$

indicates to adjust $\Delta v_2$ based on a current vehicle speed change. As the traveling speed of the suspension cylinder changes with the vehicle speed when a vehicle travels on the same road, the vehicle speed is an important factor that affects the flow consumed by the suspension system, and the formula fully takes into account the vehicle speed change.

The variable $q_{average}$ changes with consumption of high pressure oil of the vehicle within $t_0$ seconds, further fully taking into account the vehicle speed, the road condition, system leakage and other important factors that lead to changes in the flow consumed by the suspension system. With the variable $q_{average}$, the system may achieve adaptive adjustment with changes of the traveling status of the vehicle.

A total displacement adjustment quantity includes the first adjustment quantity and the second adjustment quantity, that is, $\Delta v = \Delta v_1 + \Delta v_2$. A relationship between the total displacement adjustment quantity $\Delta_v$ and a control current $\Delta i$ is obtained based on the characteristics of the variable displacement pump, that is, $\Delta i = k \cdot \Delta v$. The control current is calculated as: $i_t = i_{t-1} + \Delta i$, and output, where $i_{t-1}$ is a control current of the previous moment. The flow controller outputs the current to the variable displacement pump to change the displacement of the variable displacement pump, thus achieving flow control.

Figure 2:
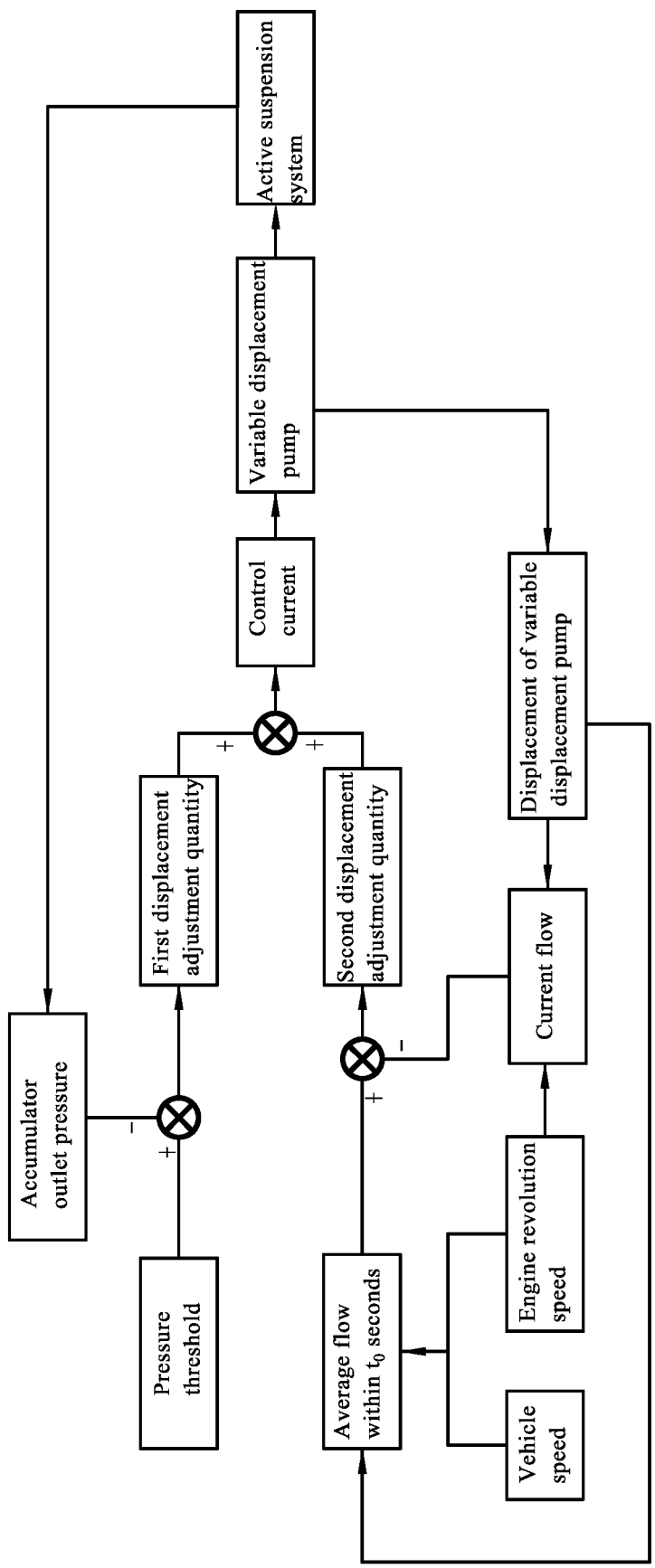
FIG. 2 illustrates a block diagram of hydraulic active suspension flow control according to the present disclosure.

In the specific implementation, N variable displacement pumps 2 may be connected in series to jointly supply high pressure oil. In this case, the final displacement adjustment quantity $\Delta v$ is the sum of displacement adjustment quantities of the N variable displacement pumps, and the final displacement adjustment quantity is allocated based on rated displacement of each variable displacement pump to obtain a displacement adjustment quantity of a single variable displacement pump. The displacement adjustment quantity of an ith variable displacement pump is $$\Delta v_i = \Delta v \cdot v_i \Big/ \sum_1^N v_i,$$

where $v_i$ denotes the rated displacement of the ith variable displacement pump, and $i=1, 2, \ldots, N$. The operating principle of the system is as shown in FIG. 2.

In the system, the variable displacement pump is driven by the engine to convey high pressure oil to each servo valve through the check valve. Each servo valve controls the suspension cylinder connected to the servo valve to extend and retract. In the traveling process of the vehicle, due to the complex action process of the suspension system, the oil consumption of the system may not be calculated accurately, such that the displacement of the variable displacement pump may not be controlled directly through the flow control method. When the flow supplied by the variable displacement pump is not equal to the flow consumed by the suspension system, if the variable displacement pump supplies too much high pressure oil, the accumulator stores the oil, and if the variable displacement pump supplies too little high pressure oil, the accumulator releases oil, so as to ensure the stable operation of the system. As the oil storage capacity of the accumulator is related to the outlet pressure, the accumulator outlet pressure is controlled. This control method may not only ensure that the oil pressure is not lower than the required pressure of the system, but also ensure that a certain amount of high pressure oil is stored in the accumulator. Due to the limited oil storage capacity of the accumulator, the accumulator may merely play a role in flow compensation when the flow fluctuates in a small range. In addition, since the system pressure change needs to be detected first for pressure control, adjustment time exists in the feedback control process, and when the engine revolution speed changes a lot, it is too late for pressure feedback control to respond, which may also cause fluctuations of the system pressure. Therefore, by detecting the engine revolution speed, the vehicle speed and other parameters, the preset flow is adjusted based on the traveling status of the vehicle, which is suitable for the actual traveling conditions of the vehicle on different roads.

Figure 3:
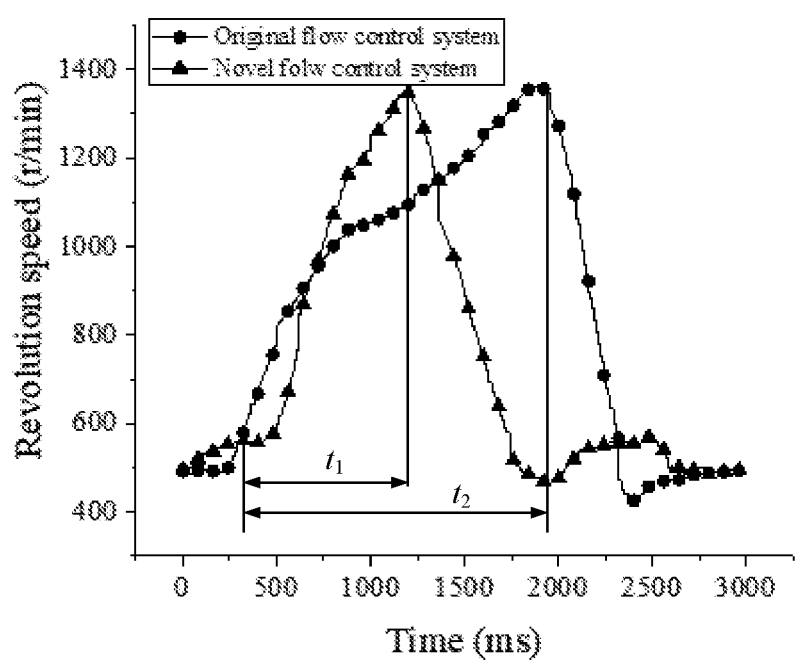
FIG. 3 illustrates comparison curves of engine revolution speed changes.
Figure 4:
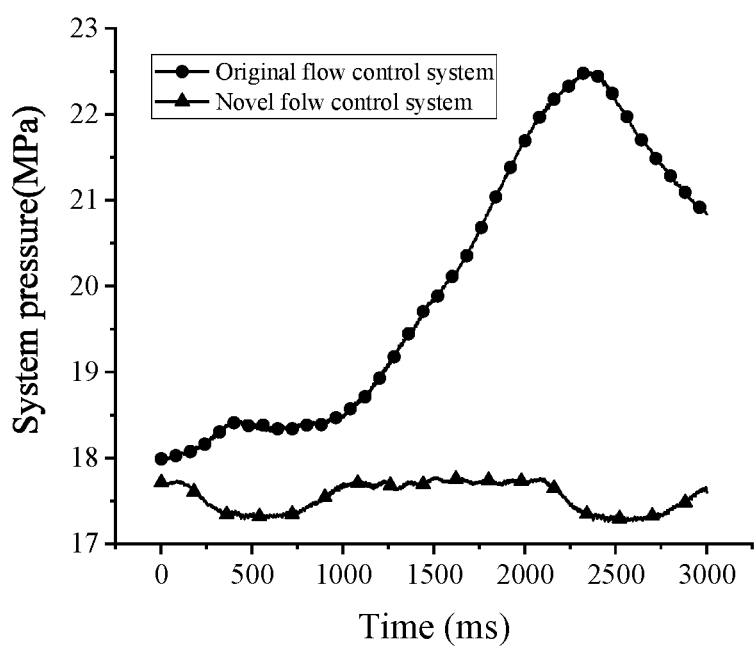
FIG. 4 illustrates comparison curves of accumulator outlet pressures.
Figure 5:
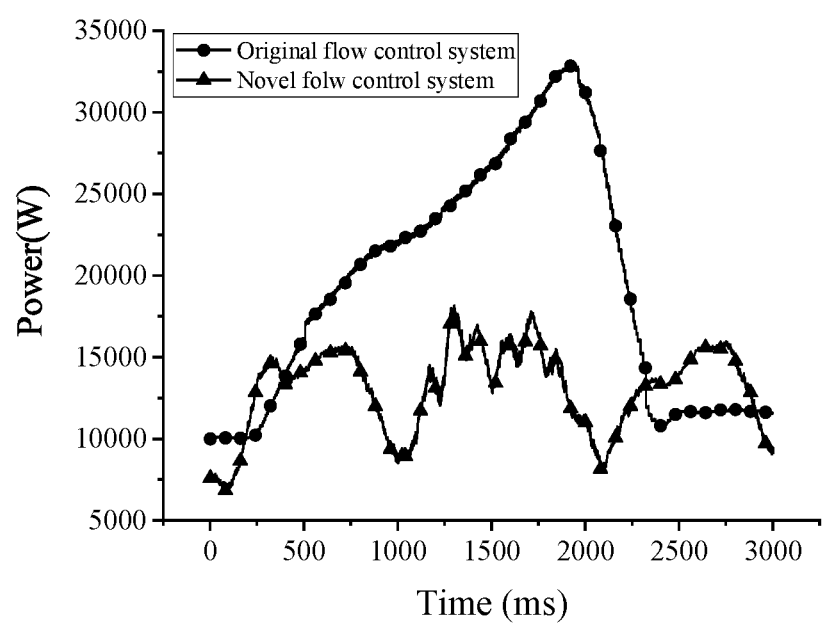
FIG. 5 illustrates comparison curves of instantaneous power consumed by systems.
Figure 6:
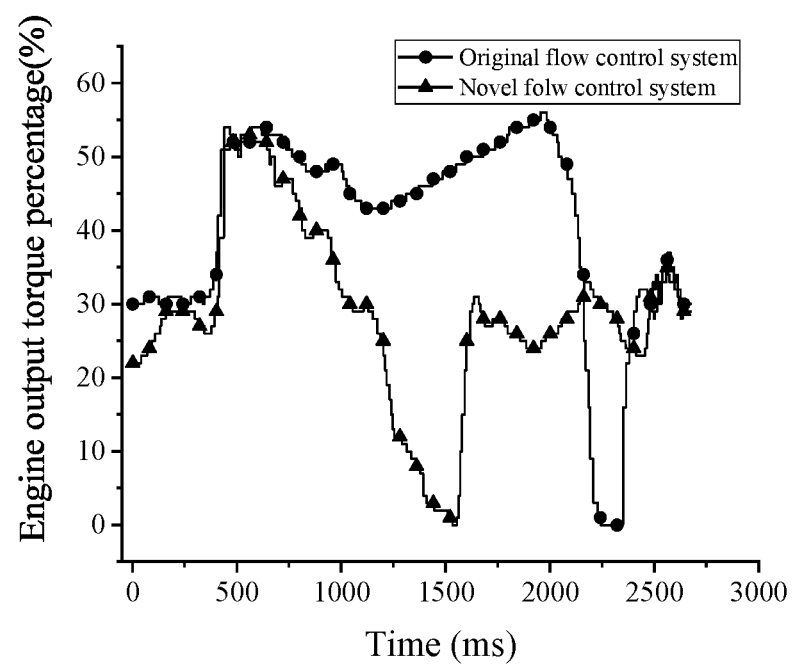
FIG. 6 illustrates comparison curves of engine output torque percentages.

During the development of the present disclosure, the inventor conducted comparison tests of the control effects in a vehicle equipped with the novel hydraulic active suspension flow control system and a vehicle equipped with an original active suspension flow control system. During the tests, the entire vehicles were propped up using outriggers and the suspension cylinders were allowed to make sinusoidal movements to simulate the flow consumption of the active suspension system in the traveling process of the vehicles. When the suspension cylinders moved at the frequency of 0.5 Hz and follow a control target steadily, a throttle pedal was momentarily pressed to the maximum extent, and was released when the engine revolution speed increased from 550 r/min to about 1400 r/min. FIG. 3 illustrates comparison curves of engine revolution speed changes. In the figure, the time $t_2$ required to increase the engine revolution speed in the original flow control system from 550 r/min to 1400 r/min was 1.65 seconds, while the time $t_1$ of the novel flow control system was 0.96 seconds, which is a 41.8% reduction in acceleration time, indicating that the torque borne by the engine during acceleration is reduced by means of the novel flow control system. FIG. 4 illustrates comparison curves of accumulator outlet pressures of the two systems. In the figure, the accumulator outlet pressure of the original control system rose from 18 MPa to 22.4 MPa, while the accumulator outlet pressure of the novel flow control system may be stabilized at a preset level of 17.8 MPa. FIG. 5 illustrates comparison curves of instantaneous power consumed by the two systems. In the figure, the engine power consumed by the original active suspension control system gradually increased with the change of the engine revolution speed and the system pressure, where the average power was 22.7 kw and the peak power reached 32.8 kw, while in the novel flow control system, the power tended to be stable, where the average power was 13.2 kw and the peak power was 17.3 kw, which were reduced by 42% and 47% respectively. FIG. 6 illustrates comparison curves of engine torque percentages of the two control systems. In the figure, an average engine torque percentage decreased from 48.7% to 29.4%, that is, a decrease of 39.6%.

Figure 7:
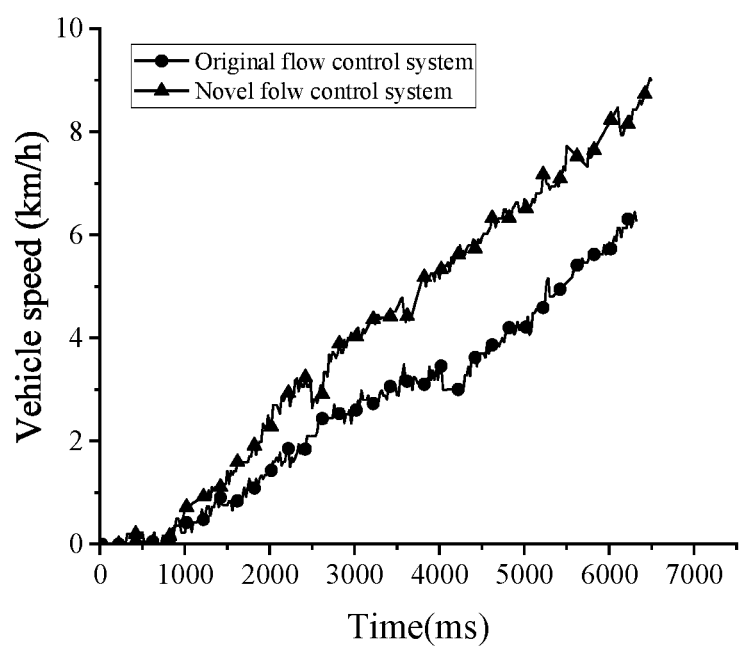
FIG. 7 illustrates comparison curves of vehicle speeds during vehicle acceleration.

To further verify the effects of this system, a comparison test was conducted for the acceleration performance of the vehicles. In both tests, the vehicles were in the same starting position, the accelerator pedal of the engine was pressed to the maximum extent during the starting phase, and traveling speed data of the vehicles was collected. FIG. 7 illustrates comparison curves of vehicle speeds during vehicle acceleration. The curves show that at the same acceleration time, a final vehicle speed of the original system reached 6.46 km/h while a final vehicle speed of the vehicle with the novel flow control system reached 8.99 km/h.

The above experimental results show that the novel flow control system can achieve adaptive adjustment of the displacement of the hydraulic pump in the case of changes of the engine revolution speed and the flow consumed by the suspension system, such that the accumulator outlet pressure can be well stabilized, at the same time, the power consumed by the system can be reduced, and the engine load can be lowered. The engine can provide more power to a traveling system, and the acceleration performance of the vehicle is significantly improved. The engine power can be utilized more reasonably while stable and continuous operation of the active suspension system is ensured.

What is claimed is:

1. A hydraulic active suspension flow control system, comprising:
    a hydraulic oil tank,
    a variable displacement pump with an oil suction port communicating with the hydraulic oil tank,
    a check valve,
    a servo valve,
    a suspension cylinder controlled by the servo valve,
    an engine revolution speed sensor configured to detect an engine revolution speed,
    a vehicle speed sensor configured to detect a vehicle speed,
    an oil pressure sensor configured to detect an accumulator outlet pressure,
    a flow controller configured to control displacement of the variable displacement pump by receiving data from the engine revolution speed sensor, the vehicle speed sensor and the oil pressure sensor, and
    a relief valve connected to the check valve in parallel and provided at an oil outlet of the variable displacement pump;
    wherein the check valve, servo valve, and suspension cylinder are connected to the oil outlet of the variable displacement pump in sequence; the variable displacement pump is connected to an engine through a clutch; and an accumulator is connected between the servo valve and the check valve;
    the flow controller is configured for closed-loop control based on an accumulator outlet pressure, a vehicle speed and an engine revolution speed by the following method:
    firstly, calculating, based on changes of the accumulator outlet pressure, a first displacement adjustment quantity of the variable displacement pump:

$$\Delta v_1 = k_1(p_0 - p_1),$$

wherein $p_0$ denotes a preset pressure threshold, $p_1$ denotes the accumulator outlet pressure, and $k_1$ denotes a proportionality coefficient;
    secondly, calculating, based on the vehicle speed and engine revolution speed detected in real time, a second displacement adjustment quantity of the variable displacement pump by the following method:
    (1) calculating an average flow provided by the variable displacement pump and an average vehicle speed within $t_0$ seconds before a current moment:

$$q_{average} = \frac{1}{t_0}\sum_{t-t_0}^{t} v_t n_t t_c \text{ and}$$

$$u_{average} = \frac{1}{t_0}\sum_{t-t_0}^{t} u_t t_c,$$

wherein $q_{average}$ denotes the average flow provided by the variable displacement pump within $t_0$ seconds, $q_{average}$ denotes the average vehicle speed of a vehicle within $t_0$ seconds, $v_t$, $n_t$ and $u_t$ denote instantaneous displacement of the variable displacement pump, an instantaneous engine revolution speed and an instantaneous vehicle speed at a moment t respectively, and $t_c$ denotes sampling time; and
    (2) calculating, based on the average flow provided by the variable displacement pump, a current vehicle speed and the engine revolution speed, the second displacement adjustment quantity of the variable displacement pump:

$$\Delta v_2 = \begin{cases} \dfrac{k_2 q_{average} u}{u_{average}}\left(\dfrac{1}{n_t} - \dfrac{1}{n_{t-1}}\right) & u \neq 0 \\ k_2 q_{average}\left(\dfrac{1}{n_t} - \dfrac{1}{n_{t-1}}\right) & u = 0 \end{cases},$$

wherein $n_t$ and $n_{t-1}$ denote engine revolution speeds at the current moment and a previous moment respectively, $k_2$ denotes a proportionality coefficient, and u denotes the current vehicle speed; and
    finally, obtaining a total displacement adjustment quantity by adding the first adjustment quantity and the second adjustment quantity, that is, $\Delta v = \Delta v_1 + \Delta v_2$, obtaining a relationship between the total displacement adjustment quantity $\Delta v$ and a control current $\Delta i$ based on characteristic of the variable displacement pump, that is, $\Delta i = k \cdot \Delta v$, calculating and outputting the control current, and adjusting the displacement of the variable displacement pump.

2. The hydraulic active suspension flow control system according to claim 1, wherein an outlet of the check valve is connected to the accumulator and a port P of the servo valve; a port A and a port B of the servo valve are connected to a rodless cavity and a rod cavity of the suspension cylinder respectively; a port T of the servo valve and an oil outlet of the relief valve are connected to the hydraulic oil tank; the oil pressure sensor is disposed at an outlet of the accumulator; and an output end of the flow controller is connected to a control end of the variable displacement pump to control the displacement of the variable displacement pump.

3. The hydraulic active suspension flow control system according to claim 1, wherein N variable displacement pumps are connected in series; the total displacement adjustment quantity $\Delta v$ is the sum of displacement adjustment quantities of all variable displacement pumps; and a final displacement adjustment quantity is allocated based on rated displacement of each variable displacement pump to obtain a displacement adjustment quantity of a single variable displacement pump, that is, an adjustment quantity of an ith variable displacement pump is:

$$\Delta v_i = \Delta v \cdot v_i \Big/ \sum_{1}^{N} v_i,$$

wherein $v_i$ denotes the rated displacement of the ith variable displacement pump, and i=1, 2, . . . , N.

4. The hydraulic active suspension flow control system according to claim 1, wherein one or more groups of servo valves and suspension cylinders controlled by the servo valves are provided.

* * * * *